Figure 1:
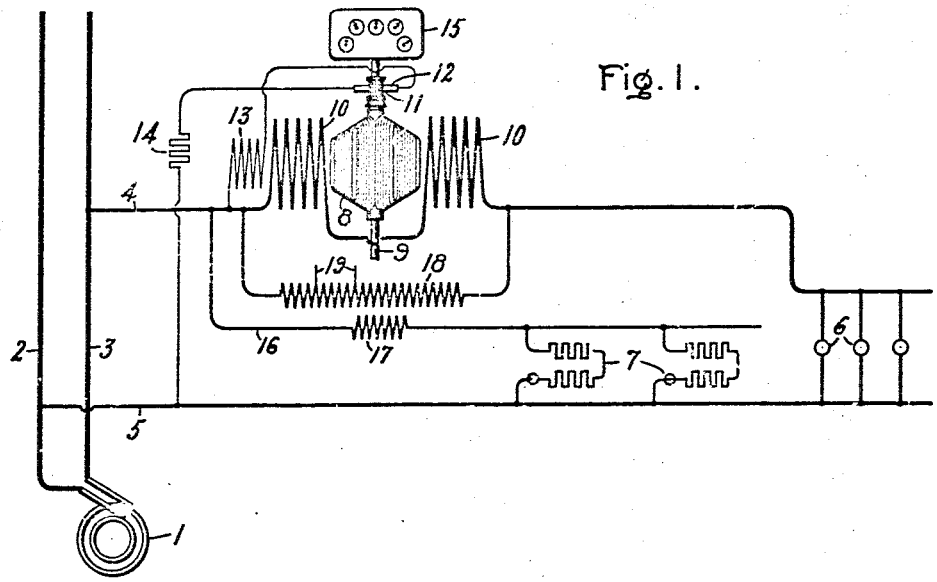

M. O. TROY.
SYSTEM OF ELECTRIC METERING.
APPLICATION FILED JUNE 3, 1905.

963,096.

Patented July 5, 1910.
2 SHEETS—SHEET 1.

Witnesses:

Inventor:
Matthew O. Troy,
by
Att'y.

M. O. TROY.
SYSTEM OF ELECTRIC METERING.
APPLICATION FILED JUNE 3, 1905.

963,096.

Patented July 5, 1910.

2 SHEETS—SHEET 2.

Witnesses:
Benjamin B. Hill
Helen Orford

Inventor:
Matthew O. Troy.
by Albert G. Davis
Att'y.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

SYSTEM OF ELECTRIC METERING.

963,096.   Specification of Letters Patent.   Patented July 5, 1910.

Application filed June 3, 1905. Serial No. 263,654.

*To all whom it may concern:*

Be it known that I, MATTHEW O. TROY, a citizen of the United States, residing at Schenectady, county of Schenectady, State of New York, have invented certain new and useful Improvements in Systems of Electric Metering, of which the following is a specification.

This invention relates to systems of metering the supply of electric energy, and especially alternating current electric energy, to translating devices.

The invention refers more particularly to systems of multi-rate metering, that is, systems in which different rates are charged for the energy consumed in different sets of translating devices, or in the same devices at different hours of the day and night or under other conditions.

My invention contemplates supplying a part or all of the current flowing in one of the actuating coils of an integrating meter by transformation from a circuit leading to the translating devices. If different rates are to be charged for current consumed in two or more different sets of translating devices, the current for one set may be carried through the actuating coil of the meter direct and that for another set may be carried through a transformer the secondary of which supplies the actuating coil, the coils of the transformer being proportioned to give the desired ratio of registrations for equal amounts of energy consumed in the two sets of devices. Or the total current in the actuating coil of the meter can be supplied by transformation by carrying the current for one set of devices through the whole and that for another set through a part of the primary of the transformer, so that equal amounts of energy used in the two sets of translating devices will effect different registrations of the meter. If the different rates are to be charged at different hours of the diurnal period, the total energy consumed may be carried direct through the actuating coil of the meter during the period of one rate and through the primary of the transformer whose secondary feeds the coil during the period of the other rate, the change in the connections being effected either by a clock mechanism on the consumer's premises or by a control circuit extending from the central station to all the meters in the system. It is obvious that taps can be provided on one or both of the coils of the transformer so that changes in the ratio of the rates charged for the energy consumed in the several sets of devices or in the different time periods can be quickly and readily made.

The novel features which I believe to be characteristic of my invention will be definitely indicated in the claims appended hereto; the features of construction and mode of operation will be understood by reference to the following description taken in connection with the accompanying drawings which show the preferred embodiments of my invention and in which—

Figure 2:
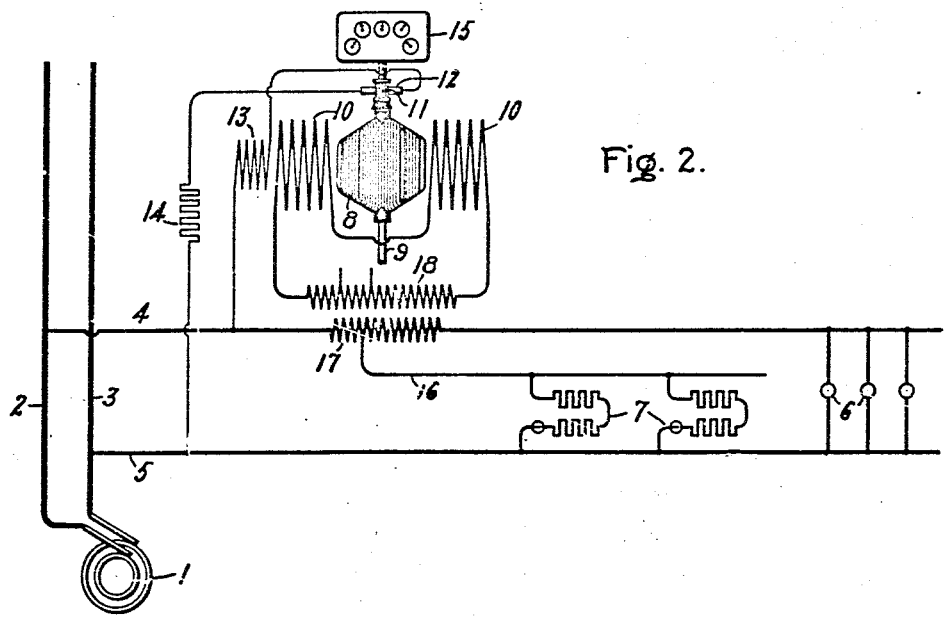
Figure 3:
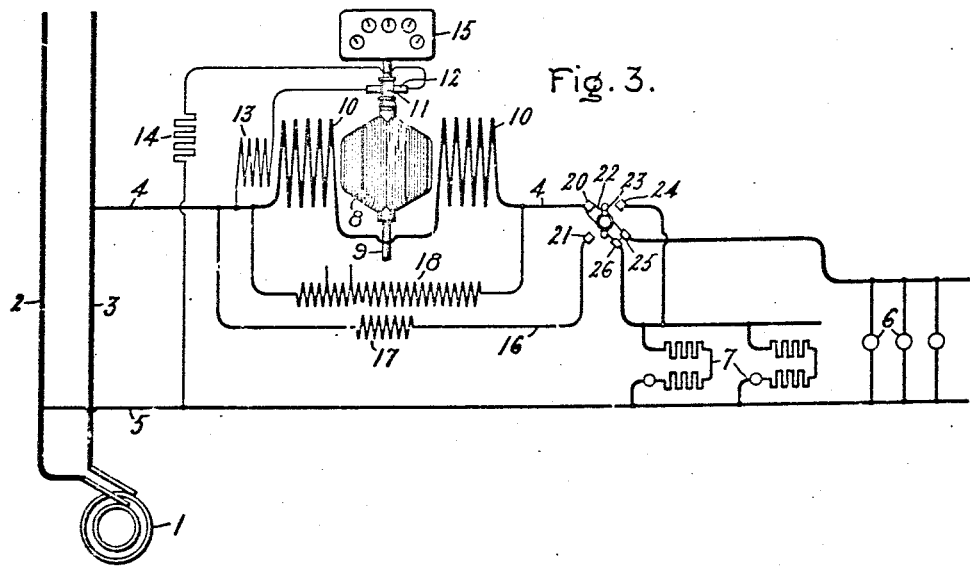
Figure 4:
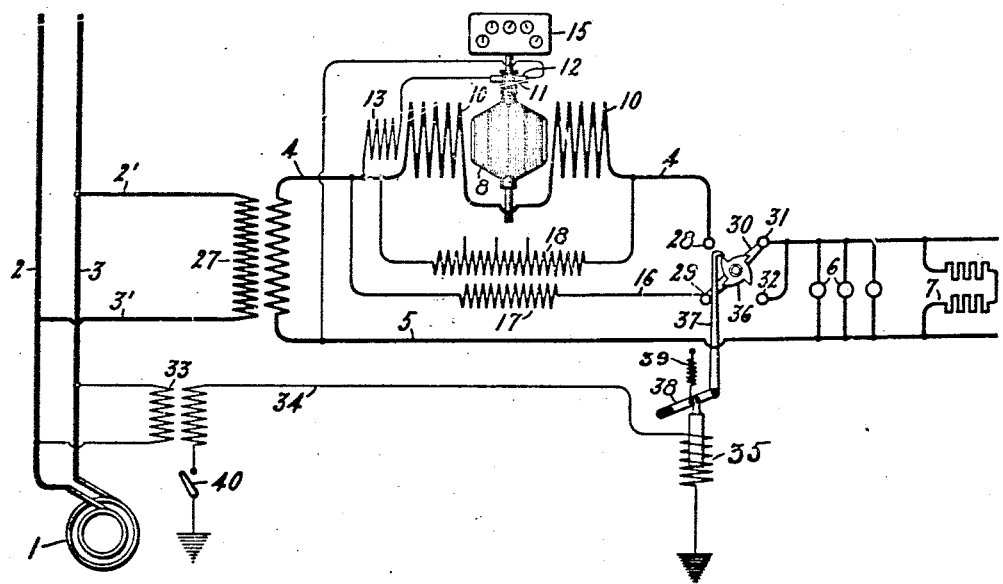

Figure 1 illustrates diagrammatically a metering system employing the principles of my invention; Fig. 2 shows a modified form in which the total current in the field windings of the meter is furnished from the secondary of a transformer, the primary of which is connected in the line carrying current to the translating devices; Fig. 3 shows a modification of the system illustrated in Fig. 1; and Fig. 4 shows another modification of the system shown in Fig. 1.

In installing electrical apparatus it frequently happens that translating devices of two or more different classes, such as lights, heaters and motors are installed upon a consumer's premises and the central station agrees to supply electric energy for all the apparatus but at different rates for the energy consumed in the devices of the different classes. Thus in order to encourage the use of electric heating devices, central stations sometimes offer to supply the energy consumed in these devices at a reduced rate so as to increase the load on the central station and also for the reason that usually a comparatively small amount of energy is used for heating purposes during the period of peak load.

Obviously it is very desirable to have a single meter arranged to register the energy consumed in all the sets of translating devices and preferably to register it upon the same dial by making the ratio of the registrations for equal amounts of energy consumed in the two sets of devices the same as the ratio of the rates to be charged therefor. A system of metering by which this is accomplished is illustrated diagrammatically in Fig. 1. Referring to that figure, 1 indicates an alternating current generator, and 2 and 3 mains leading therfrom to the premises of the various consumers. 4 and 5 indicate branch mains from the mains 2 and 3 entering a consumer's house and supplying two or more sets of electric translating devices, as for instance, lights 6 and electric heaters 7.

The energy consumed in the sets of translating devices is metered by an integrating electric meter of ordinary construction. In the drawing I have illustrated a commutating meter of the well-known Thomson type, but I wish it distinctly understood that meters of other types may be used in the place of that shown and that my invention is in no way limited to a meter of any particular type. The meter illustrated consists of an armature 8 carried by a rotatable shaft 9 and field coils 10 mounted in inductive relation to the armature 8. Shaft 9 carries a commutator 11, the segments of which are connected to the coils of the armature 8, and brushes 12 bear on the commutator 11 to carry the current to and from the armature. An auxiliary field coil 13 to compensate for friction in the meter and a resistance 14 are connected in series with the armature 8 across the mains 4 5 so that a very small current varying with the potential across the mains flows in this shunt circuit. The shaft 9 is geared to the dial train 15 which registers the energy consumed in the translating devices. The field coils 10 10 are connected in the main 4 leading to one set of translating devices, as for instance the lights 6, so that the current flowing therein and hence the rate of rotation of the moving element of the meter varies with the number of lights 6 that are cut into circuit. The other set of devices, as the heaters 7, are supplied with current by a lead 16 connected to the main 4 at a point between the main 3 and the series coils 10 10 so that current consumed in the heaters 7 does not flow through the actuating coils 10 of the meter. The primary 17 of a small series transformer is connected in the main 16 and the secondary 18 thereof is connected to the terminals of the series coils 10 10 of the meter. Therefore when one or more of the heaters 7 are cut into circuit, a current flows in the primary 17 of the transformer varying in value with the number and capacity of the heaters 7 connected in circuit and this induces a current proportionate thereto in the secondary 18 of the transformer; the secondary 18, as above explained, is connected to the terminals of the actuating coils 10 10 so that a current is obtained in the coils 10 10 and a rotation of the moving element of the meter effected directly proportional to the current consumed in the heaters 7. The consumption of current in either the lights or the heaters therefore causes rotation of the moving element of the meter but equal amounts of energy consumed in the two sets of devices do not cause equal amounts of rotation.

The ratio of the rotations of the moving element of the meter due to the consumption of equal amounts of energy in the two sets of devices is the same as the ratio of the turns in the two coils of the transformer and this ratio is made the same as that of the prices to be charged for equal amounts of energy consumed in the two sets of translating devices. Thus if the ratio of the turns in the coils of the transformer is such that a three to one reduction of current is obtained, energy consumed in the heaters 7 would effect only one-third the registration on the dial as the same amount of energy consumed in the lights 6 and if fifteen cents per kilowatt hour were charged for lighting current the rate for heating current would be five cents per kilowatt hour. Taps 19 are provided on one or both of the coils of the transformer so that this ratio may be readily adjusted whenever it is desired to make a change in the ratio of the rates. Thus, if connection were made from one of the taps 19 to the terminal of the series coil 10 instead of from the end of the secondary 18, the ratio of reduction would be decreased and a corresponding change made in the ratio of the rates charged.

In Fig. 2 I have shown a slightly modified system of metering in which the series coil of the meter is not directly connected in the system at all, but is supplied with current entirely by induction. The various parts are the same as those similarly numbered in Fig. 1 but the series coils 10, 10 are not connected to the main 4; instead the primary of a series transformer is connected in the main 4 and the secondary supplies the series coils 10. The lead 16 carrying the current to the heaters 7 is connected to a point on the primary of the transformer so related that current flowing through the section of the primary 17 to the lead 16 will induce in the secondary 18 a current which bears to the current induced therein by an equal amount of current flowing through the entire primary 17 to the lights 6 the same ratio as the ratio of the rates charged for the heating and lighting current.

The maximum load on a central station in almost all cases is in the early part of the evening when practically all the consumers are using lights. During a large part of the day, however, the load on the central station is comparatively light and energy could well be supplied at a lower rate than in the evening to keep the generating apparatus loaded. In the systems illustrated in Figs. 1 and 2, lighting current can be used at the high rate and heating current at the low rate at any time during the day and night, that is, current can be used at the low rate during the period of peak load. It has been proposed to provide means whereby the consumption of energy in the devices which constitute the peak load renders it impossible to use energy in the other devices at the low rate. With this system where lights and heaters are installed on a consumer's premises the consumption of energy in the lights makes it impossible to use current in the heaters at the low rate but in order that the consumer may use his heaters at all times the connections are so arranged that while using the lights he can also use his heaters but must pay for the current consumed therein at the high rate.

The principles of my invention can be readily employed in such a system as shown in Fig. 3. The circuit connections of the meter in this case are the same as those shown in Fig. 1 but the lines 4 and 16 instead of running direct to the lights 6 and heaters 7 are connected to two stationary contacts 20 and 21 respectively of a hand-operated switch having a movable member 22 operated by a handle 23. The switch blade 22 is arranged to connect the contact 21 with a contact 24 in one position and in the other position to connect the contact 20 with two contacts 25 and 26. Contact 25 is connected to the lights 6 and the contacts 24 and 26 to the heaters 7. In the position of the switch blade 22 illustrated in the drawings, both the lights 6 and heaters 7 can be used and the current flows from the main 3 through the branch main 4, the actuating coils 10 of the meter, contact 20, blade 22 and contacts 25 and 26 to both the ligths and the heaters, so that the current consumed in both sets of devices effects a registration at the high rate. But during the time when the consumer does not care to use his lights 6 he may turn the switch blade 22 so that it cross-connects contacts 21 and 24. In this position the lights 6 are disconnected from the circuit but the heaters 7 may be used and the current therefor flows not through the actuating coils 10 but through the primary 17 of the series transformer and then to the heaters and the current in the actuating coils 10 is supplied by the secondary 18 of the transformer. The registration is therefore at the low rate this rate being determined by the ratio of the turns in the primary and secondary coils 17 and 18. Thus the current used in the heaters at times when the lights are in use must be paid for at the high rate but during the period when the consumer does not care to use his lights the heaters may be used at the low rate for the current consumed therein.

In some systems of metering it is desired to have the change from one rate to another take place at definite hours. This is usually effected by a clock mechanism mounted in the meter and arranged to make the necessary change in the electrical or mechanical connections at predetermined hours or by running a control line from the central station through relays in all the meters so arranged that when the control circuit is closed the relays effect the necessary changes in the connections. The principles of my invention are also applicable to a system of this kind as illustrated in Fig. 4 of the drawings. In this figure, 1 illustrates an alternating current generator and 2 and 3 the mains leading therefrom as in the other figures, and 2' and 3' branch mains leading to a transformer 27 which reduces the voltage of the mains 2 and 3 to that required on the mains 4 and 5 for the translating devices on the premises of a single consumer or a group of consumers. The meter is connected in the circuit of the mains 4 and 5 in the same manner as in Figs 1 and 3. Line 4 runs from the actuating coils 10 of the meter to a stationary contact 28 of a switch and the line 16 from the primary 17 of the series transformer is connected to a similar contact 29.

A pivoted switch blade 30 is arranged to connect contact 29 with a stationary contact 31 in one position and in the other position to connect contact 28 with a contact 32, and contacts 31 and 32 are both connected to one side of the lights 6 and heaters 7. In the position of the switch blade 30 illustrated in the drawing, the entire current consumed in the lights and heaters passes through the primary 17 of the transformer and the registration is therefore at the low rate. When the switch blade is turned on its pivot 90° all the current consumed flows through the coils 10 direct to the contact 28 then through the blade 30 to contact 32 and then to the translating devices and the registration is then at the high rate. The switch blade 30 may be turned to change the connection automatically in any of the well-known fashions, or may be actuated in any well-known fashion from the central station. In the drawings means for operating in the latter way is illustrated. At the central station a small transformer 33 is connected across the mains 2, 3 and the secondary of the transformer is connected on one side to a control wire 34 running to the energizing coils 35 of electromagnets in all the meters.

Secured to the switch blade 30 is a ratchet wheel 36 and a pawl 37 pivoted to the movable member 38 of the magnet engages with the teeth of the ratchet. A spring 39 is arranged to retract the member 38 when the magnet is deënergized. The other side of the transformer 33 is connected to ground through a small switch 40 which may be operated in any of the well-known fashions automatically or by hand. At the time when the change from one rate to another is to take place the switch 40 is closed for a few seconds thus closing circuit through the coils 35 of the electromagnets. When the magnet is energized member 38 is drawn down and by means of pawl 57 and ratchet 36 the switch blade 20 is turned 90° so that the current consumed in the lights 6 and heaters 7 passes through the actuating coils 10 direct instead of through the primary 17 of the transformer or vice versa thus effecting the change in the rate of registration.

I do not wish to be understood as limited to the exact arrangement which I have herein shown and described as many modifications can be made therein.

I have illustrated a commutating integrating wattmeter which may be used on alternating current circuits as well as direct current circuits but I wish it understood that ammeters or wattmeters of the induction or other types may be used as well. All such modifications I consider within the scope of my invention and I aim to cover them in the claims appended hereto.

What I claim as new and desire to secure by Letters Patent of the United States, is,—

1. In a system of electric metering, the combination of a meter, an actuating coil therein, electric translating devices, series connections between said coil and said translating devices, other translating devices and a transformer whose primary is connected in series relation to the second-named translating devices and whose secondary is connected to said actuating coil.

2. In a system of multi-rate metering, the combination of electric translating devices, an electric meter, an actuating coil therein, connections for supplying said coil with current bearing a definite relation to current consumed, and means for supplying the coil with current bearing a different relation to current consumed.

3. In a system of multi-rate metering, the combination of electric translating devices, an electric meter, an actuating coil therein, series connections between said coil and said translating devices to obtain a current therein bearing a definite relation to current consumed in said translating devices, other translating devices, and means for supplying the coil with current bearing a different relation to current consumed in the second-named translating devices.

4. In a system of multi-rate metering, the combination of electric translating devices, an electric meter, an actuating coil therein, series connections between said coil and said translating devices to obtain a current therein bearing a definite relation to current consumed, a transformer whose secondary is connected to said actuating coil, other translating devices and means for connecting the primary of the transformer in series relation to the second-named translating devices to supply said coil with current bearing a different relation to current consumed in the second-named translating devices.

5. The combination with a plurality of sets of electric translating devices and an electric meter having an actuating coil in which the current varies with the current consumed in said devices, of means including a transformer the secondary of which is in circuit with said coil for causing the meter to register the energy consumed in said sets of devices at different rates for the different sets of devices.

6. In a system of multi-rate electric metering, the combination of a plurality of sets of electric translating devices, an electric meter, an actuating coil therein, connections for including said coil in series relation with one of said sets of devices, and means including a transformer for obtaining a current in said coil derived from the circuit of another of said sets of translating devices.

7. In a system of electric metering, the combination of a plurality of sets of electric translating devices, an electric meter, an actuating coil therein, means including a transformer for obtaining a current in said coil bearing a definite relation to the current consumed in one of said sets of devices, and connections for supplying a current to said coil bearing a different relation to current consumed in another of said sets of translating devices.

8. In a system of electric metering, the combination of a plurality of sets of electric translating devices, an electric meter, an actuating coil therein, connections for supplying a current to said coil bearing a definite relation to the current consumed in one of said sets of devices, and means including a transformer for obtaining a current in said coil bearing a different relation to current consumed in another of said sets of translating devices.

9. In a system of electric metering, the combination of a plurality of sets of electric translating devices, an electric meter, an actuating coil therein, connections for including said coil in series relation with one of said sets of devices, a transformer whose secondary is connected with said coil, and series connections between the primary of said transformer and another of said sets of translating devices.

10. A system of multi-rate metering comprising mains entering a consumer's premises, two sets of electric translating devices connected thereto, an integrating electric wattmeter, series and shunt coils therein, the shunt coil being connected across the mains, series connections between the series coil and one of said sets of translating devices, a transformer whose secondary is connected to said series coil, and series connections between the primary of the transformer and the other set of translating devices.

11. In a system of electric metering, the combination of a meter, an actuating coil therein, electric translating devices, series connections between said coil and translating devices, a transformer whose secondary is connected to said actuating coil, series connections between the primary of said transformer and translating devices, and taps on one of the coils of said transformer to facilitate varying the ratio of transformation.

12. The combination with a plurality of sets of electric translating devices and an electric meter whose moving element is actuated when current is consumed in said devices, of means including a transformer for causing the meter to register the energy consumed in said sets of devices at different rates for the different sets of devices, and taps on one of the coils of said transformer to facilitate varying the ratio of transformation.

In witness whereof, I have hereunto set my hand this 2nd day of June, 1905.

MATTHEW O. TROY.

Witnesses:
  BENJAMIN B. HULL,
  HELEN ORFORD.